Nov. 8, 1938.  W. S. BRINK  2,135,481
VEHICLE WHEEL
Filed Nov. 20, 1934
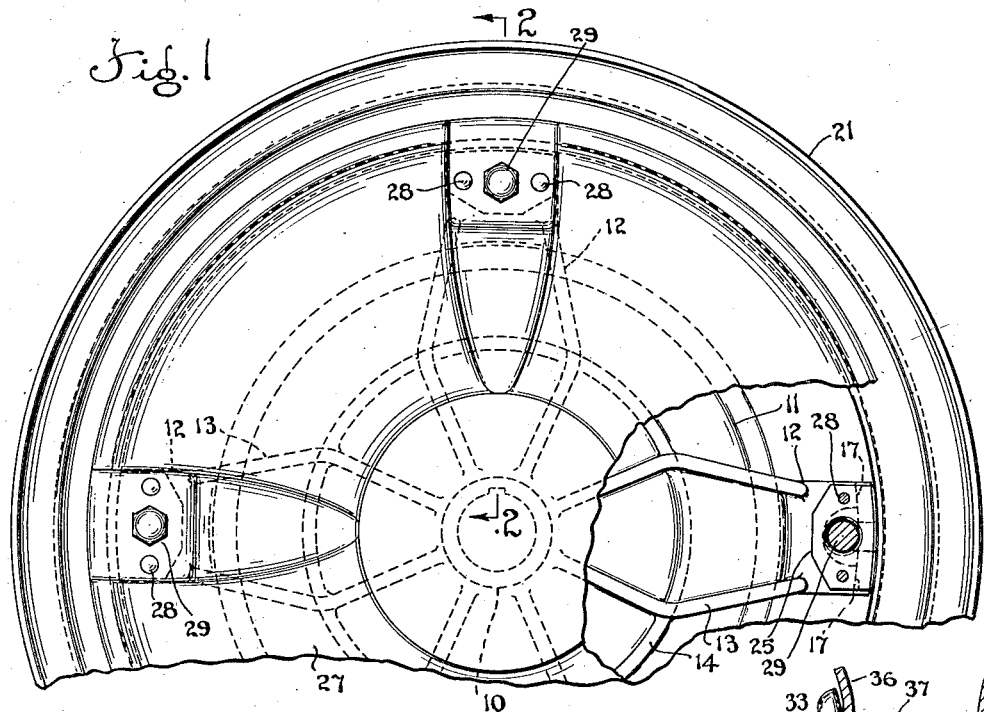
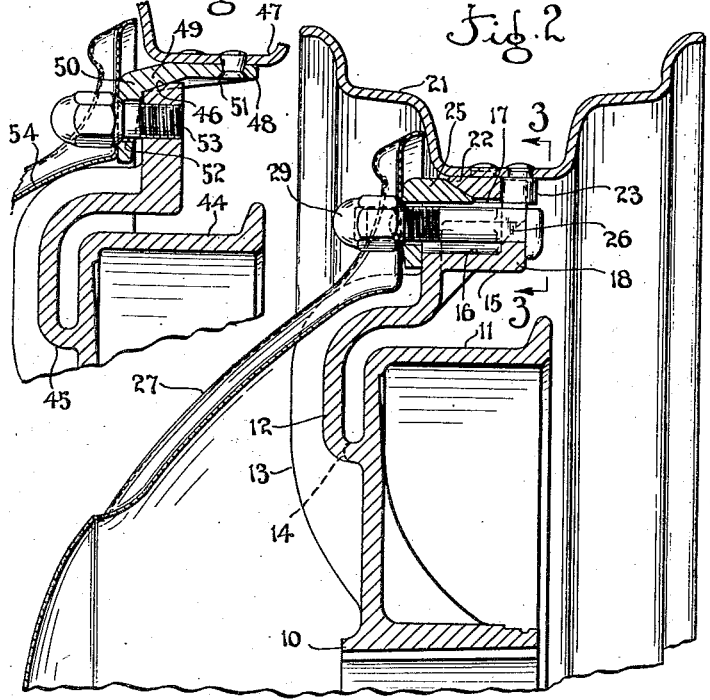
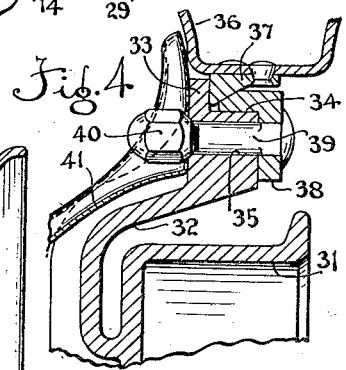
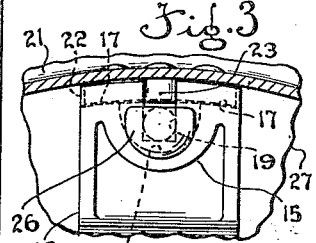
INVENTOR
Winfield S. Brink
ATTORNEY Patented Nov. 8, 1938

2,135,481

UNITED STATES PATENT OFFICE 2,135,481

VEHICLE WHEEL

Winfield S. Brink, Akron, Ohio, assignor to The Firestone Steel Products Company, Akron, Ohio, a corporation of Ohio Application November 20, 1934, Serial No. 753,808

2 Claims. (Cl. 301—6)

This invention relates to vehicle wheels, and more especially it relates to automobile wheels of the type wherein the tire rim is carried by the brake drum and an ornamental cover, in simulation of spokes or a disc wheel, is mounted upon the front of the wheel.

The chief objects of the invention are to provide an improved manner for mounting the tire rim upon the brake drum; to prevent heat transfer from the brake drum to the tire rim; to provide readily and conveniently for the demounting of the tire rim; to provide an improved construction for relieving the rim-attaching bolts of driving torque and strains incidental to braking; and to provide improved means for attaching the ornamental cover to the wheel. Other objects will be manifest as the specification proceeds.

Of the accompanying drawing:

Figure 1 is a fragmentary front elevation of a vehicle wheel embodying the invention in its preferred form, a part of the ornamental cover being broken away;

Figure 2 is a section on the line 2—2 of Figure 1;

Figure 3 is a section on the line 3—3 of Figure 2;

Figure 4 is a fragmentary radial section through a modified embodiment of the invention; and Figure 5 is a fragmentary radial section through another modified embodiment of the invention.

Referring to the drawing, 10 is the hub of the wheel and 11 is a brake drum that is cast integral therewith. The brake drum 11 carries a plurality of radial spokes or arms 12, 12, herein shown as four in number, which arms have the general shape of a reverse curve. Each arm 12 is cast integral with the brake drum, extending from the front, vertical wall thereof at an appreciable distance from its outer periphery, and curving rearwardly over the said outer periphery of the drum, the extremity of the arm extending radially of the drum. Suitable radial ribs 13 and an annular rib 14 on drum 11 are provided for strengthening the arms 12. The extremity of each arm 12 is formed with a box-like structure 15 defining a recess 16 that is open at the front, and the respective lateral walls of the structure having transversely arcuate top faces 17 that are concentric with the axis of the wheel. The rear wall 18 of the structure is higher than said lateral walls, is arcuate concentric with the axis of the wheel, and is formed with a deep slot 19 disposed radially of the wheel.

The wheel includes a tire rim 21 herein shown as being of the drop-center type, although other types of rims may be used. Mounted upon the inner periphery of the tire rim 21 is a plurality of cleats 22, 22, herein shown as four to correspond with the number of arms 12, said cleats being arcuate so as to conform to the circumferential curvature of the rim. Each cleat 22 has a beveled front marginal face, and has a driving lug 23 formed on its rear marginal face and extending rearwardly therefrom. The arrangement is such that when the rim 21 is mounted on the wheel, cleats 22 will rest upon the arcuate top faces 17 of the sidewalls of structures 15 of the arms 12, the driving lugs 23 of the cleats extending into respective slots 19 with a nice fit whereby the rim structure is mechanically interlocked with the rear wall 18 of structure 15 and driving connection between the hub and rim of the wheel is effected.

For securing the rim 21 in place upon the arms 12, clamps 25 and bolts 26 are provided, said clamps being L-shaped in section, and being permanently secured to the rear face of an ornamental cover 27 by means of rivets 28. The clamps 25 are so arranged that the axially projecting portions thereof will rest upon the arcuate top faces 17 of the structures 15 when the cover is mounted upon the wheel, the outer ends of said projecting portions of the clamps being beveled complementally to the beveled front margins of the cleats 22 so as to engage the latter in face-to-face contact. Those portions of the clamps 25 that are riveted to the cover 27, and the cover itself, are suitably apertured to receive the respective bolts 26, the latter being mainly positioned within the respective recesses 16, one end of each bolt extending through slot 19 and having its head bearing against the rear face of rear wall 18 of the structure 15, the other end of the bolt extending through the cover 27 and having a nut 29 threaded thereon. When the nuts 29 are set up, cleats 22 on rim 21 are forced rearwardly against the rear wall 18 of structure 15, whereby the lugs 23 are securely retained in slots 19 and good driving connection between the hub and the rim is effected.

The feature of having the arms 12 in the shape of a reverse curve provides greater surface area for air to circulate about, and permits the arms to be united with the brake drum remote from the hot, braking surface thereof, with the result that conduction of heat from the brake drum to the tire rim practically is eliminated. The shape of the arms 12 also results in a more compact wheel structure since the tire rim is disposed directly over the brake drum instead of at one side thereof. The mechanical interlock of the cleats 22 with the arms 12 through the agency of the lugs 23 obviates the possibility of relative angular movement between the hub and tire rim, and assures the delivery of driving torque to the rim without imposing severe shearing strains upon the bolts 26, with the result that fewer of the latter are required and the mounting and dismounting of the tire rim is facilitated.

The feature of permanently attaching the clamps 25 to the ornamental cover prevents loss of the clamps, and obviates the use of separate attaching means for retaining the cover in place on the wheel.

In the modified embodiment of the invention shown in Figure 4, the brake drum 31 is formed integrally on its front face with a plurality of radial arms, such as the arm 32, which arm is similar to the arms 12 except that its outer extremity is formed at its front with an upstanding flange 33 and a ledge 34 at the rear thereof. The terminal portion of the arm 32 also is formed with a bolt-hole 35. The wheel includes a tire rim 36 provided on its inner periphery with driving lugs such as the lug 37, each of said lugs comprising a front face that is parallel to the plane of the wheel, and an oblique or beveled rear face. When the rim 36 is mounted on the wheel, the front face of lug 37 is flush against the rear face of flange 33, the beveled rear face of the lug being engaged by the complementally beveled end face of an L-shaped clamp 38 that rests upon the ledge 34, a portion of said clamp extending radially inwardly at the rear of arm 32 and being formed with a bolt hole. A bolt 39 having its head bearing against clamp 38, extends through the bolt hole in said clamp and through bolt-hole 35 in arm 32, a nut 40 being threaded onto the front end of the bolt for the purpose of urging the clamp 38 forwardly into wedging engagement with the driving lug 37 on rim 36. Preferably an ornamental cover 41 is retained on the front of the wheel by the nuts 40. This embodiment of the invention is somewhat simpler than the preferred embodiment, yet possesses many of the advantages of the latter. The rim is easily mounted from the front of the wheel, when cover 41 is removed, by moving the rim axially to proper lateral position while the lugs 37 are out of registry with said flanges, behind the same.

In the embodiment of the invention shown in Figure 5, the brake drum 44 is formed on its front face with a plurality of radial arms, such as the arm 45, which arm is similar in all respects to arms 12, 32 of the previously described embodiments with the exception of its terminal portion, which is radially disposed and has its end face beveled on its front margin as shown at 46. This embodiment of the invention includes a tire rim 47 having a plurality of cleats 48 secured on its inner peripheral face, each of said cleats comprising an oblique, laterally and forwardly extending portion 49 that terminates in a radially extending portion 50. A web 51 is formed at each end of the cleat 48 and extends from the rear margin of the cleat to the juncture of portions 49, 50 thereof. When the rim 47 is mounted upon the wheel, the under surface of oblique portion 49 of the cleat 48 rests flush upon the beveled surface 46 on the outer end of arm 45, the webs 51 of the cleat being disposed at each side of the lateral margins of the end of the arm. The arrangement provides a mechanical interlock of the cleat and arm which serves to relieve the attaching screws of some of the driving torque. The radially extending portion 50 of the cleat is formed with an aperture 52, and a cap-screw 53 extends therethrough and is threaded into the end portion of arm 45 for the purpose of securing the rim to said arms. Preferably an ornamental cover 54 is retained on the front of the wheel by the heads of cap screws 53.

Other modifications may be resorted to without departing from the spirit of the invention or the scope of the appended claims.

What is claimed is:

1. A vehicle wheel body comprising a brake drum and a plurality of spokes constituting a unitary structure, said spokes being united with the vertical wall of the brake drum relatively remote from the perimeter thereof and being otherwise laterally spaced from the said vertical wall of the brake drum, the latter constituting the sole support for said spokes.

2. A vehicle wheel body comprising a brake drum and a plurality of spokes constituting a unitary structure, said spokes being united with the wall of the brake drum relatively remote from the perimeter thereof, and being reversely curved over the perimeter thereof so that their terminal portions are disposed radially outwardly of the braking surface of the drum.

WINFIELD S. BRINK.